J. E. VANSANT.
Portable Shower-Bath Apparatus.
No. 225,439. Patented Mar. 9, 1880.
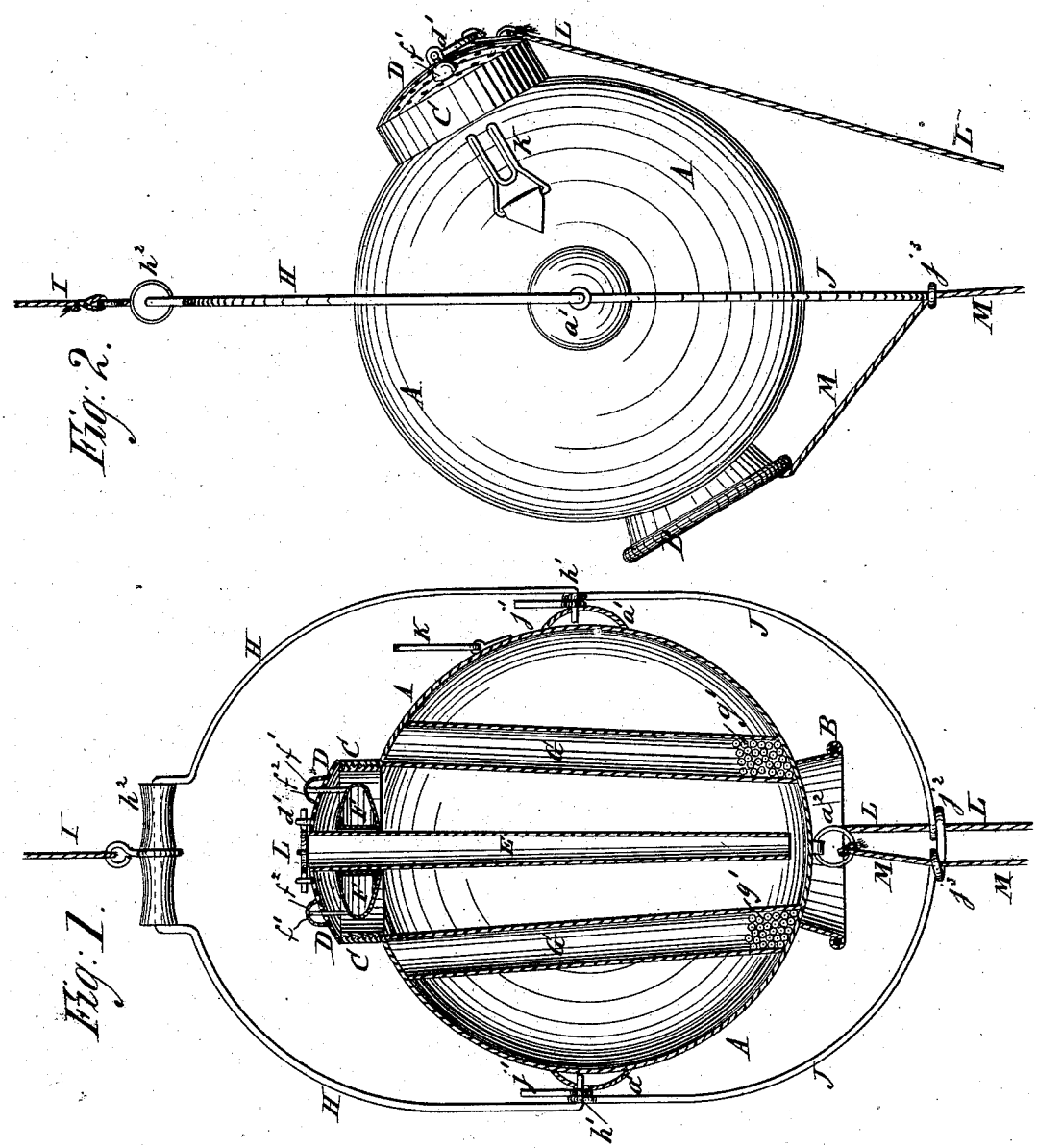
WITNESSES:
Achilles Schehl.
C. Sedgwick
INVENTOR:
J. E. Vansant
BY Munn & Co.
ATTORNEYS.

UNITED STATES PATENT OFFICE.

JAMES E. VANSANT, OF COVINGTON, KENTUCKY.

PORTABLE SHOWER-BATH APPARATUS.

SPECIFICATION forming part of Letters Patent No. 225,439, dated March 9, 1880.

Application filed September 16, 1879.

*To all whom it may concern:*

Be it known that I, JAMES EDWARDS VANSANT, of Covington, in the county of Kenton and State of Kentucky, have invented a new and useful Improvement in Portable Shower-Bath Apparatus, of which the following is a specification.

Figure 1 is a sectional elevation of my improvement. Fig. 2 is a side elevation of the same.

The object of this invention is to furnish a simple and conveniently-operated portable shower-bath apparatus.

The invention consists in the combination, with a suitable water-vessel which is to be supported by a bail, of a sprinkler, an air-tube, an indicating-float, ballasting-weights, and other appliances for operating the apparatus, as hereinafter fully described.

Similar letters of reference indicate corresponding parts.

A represents a water-vessel of any desired shape and size, but which I prefer to make of a spherical form. To the bottom of the vessel A is attached a supporting-rim, B. In the top of the vessel A is formed an opening, around which is a flange, C, having a screw-thread on its outer surface to receive a screw-cap, D, which is perforated with numerous small holes for discharging the water in fine streams. The top of the cap D is convexed, so that the streams of escaping water may be divergent.

In an aperture in the center of the perforated cap or sprinkler D is secured the larger end of a tapering tube, E, which extends nearly to the bottom of the vessel A, as shown in Fig. 1. The tube E is designed to serve as a filling-tube, the water being poured through it into the vessel A. The tube E also serves as an air-tube to admit air, to cause the water to flow out when the vessel is inverted. Upon the extreme upper part of the tube E is placed a ring-float, F, which is supported, when the vessel A is erect and empty, by wires $f'$, which wires pass out through holes in the sprinkler D, and have heads $f^2$ formed upon or attached to their outer ends. When the vessel A is filled with water the float F rises and indicates, by the rise of the heads $f^2$ of the wires $f'$, that enough water has been poured in.

In the side parts of the vessel A are secured upright tubes G, which are closed at both ends, and in which are placed shot $g'$, or quicksilver, or other heavy substance, which moves from end to end of the said tubes when the vessel A is inverted, and serves as ballast to give the said vessel steadiness of position.

H is a bail, the ends $h'$ of which are bent inward and inserted in sockets $a'$ attached to the opposite sides of the vessel A. The bail H is provided with a handle, $h^2$, for convenience in carrying the vessel A, and to which handle may be attached a cord, I, for suspending the said vessel.

J is a second bail, the arms of which have holes or eyes formed in them near their ends to receive the ends $h'$ of the bail H, as shown in Fig. 1.

The ends $j'$ of the bail J project, and may be connected with the arms of the bail H by slides, to rigidly connect the two bails when the apparatus is in use. These slides are not shown in the drawings.

When the apparatus is not in use the bail J is turned up within the bail H, and is secured in place by a slotted catch, K, hinged to the side of the vessel A. The catch K also serves to give rigidity to the bail H when the vessel A is being carried. To the middle part of the sprinkler D is attached, by a hinged ring, $a'$, or other suitable means, the end of a cord, L, which cord is passed through an eye, $j^2$, formed in the middle part of the bail J.

To the center of the bottom of the vessel A is attached, by a hinged ring, $a^2$, or other suitable means, the end of a cord, M, which cord is passed through an eye, $j^3$, formed in the middle part of the bail J.

In using the apparatus the vessel A is filled with water and suspended by the handle H' from the ceiling or other suitable point, in the manner hereinbefore described. The catch K is then thrown back, and then by pulling upon the cord L the vessel A will be inverted, the water in the tube E will flow out, air will enter the vessel A through the tube E, and the water will descend in a shower. The outflow of the water can be stopped at any time by pulling the cord M, which turns the vessel A back into an erect position.

Having thus fully described my invention, I claim as new and desire to secure by Letters Patent—

1. The combination, with the vessel A and sprinkler D, of the tube E, substantially as herein shown and described.

2. The combination of the indicating-float F, provided with wires $f$, having heads $f''$ formed on their outer ends, with the vessel A, substantially as herein shown and described.

3. The combination of the tubes G and the ballasting-weight $g'$ with the pivoted vessel A, substantially as herein shown and described.

4. The combination of the bail J and cords L M with the pivoted vessel A and the main bail H, substantially as herein shown and described.

5. The combination, with the bails H J, of the hinged catch K, substantially as herein shown and described.

JAMES EDWARDS VANSANT.

Witnesses:
L. G. BANNING,
GEO. PERKINS.